United States Patent Office 3,529,262
Patented Sept. 15, 1970

3,529,262
INFRARED LASER WITH DISCHARGE GAS INCLUDING CARBON DIOXIDE, NITROGEN AND WATER VAPOR
Wilhelmus Jacobus Witteman, Emmasingel, Eindhoven, Netherlands, assignor, by mesne assignments, to U.S. Philips Corporation, New York, N.Y., a corporation of Delaware
Filed July 21, 1966, Ser. No. 566,864
Claims priority, application Netherlands, July 28, 1965, 6509730
Int. Cl. H01s 3/22, 3/09, 3/02
U.S. Cl. 331—94.5          6 Claims

ABSTRACT OF THE DISCLOSURE

A gas discharge laser with an atmosphere of carbon dioxide, nitrogen and water vapor.

---

The invention relates to stimulated emission devices and more particularly to the production of infrared emission as a result of an electric discharge in carbon dioxide gas.

Devices for producing stimulated infrared emission, commonly termed irasers, have been operated in a continuous manner with a discharge space, approximately five meters in length and filled with gaseous carbon dioxide at a pressure of the order of 0.8 torr. The strongest transition thus produced in a wave length range approximately 10.65 microns has an intensity in the range approximating 1 mw.

A known mode of enhancing the iraser effect is by the addition of nitrogen to the carbon dioxide in the discharge space. The nitrogen molecule readily transfers oscillatory energy to the higher energy levels of the carbon dioxide gas involved in the iraser transitions, thereby raising the intensity considerably.

A prime object of the present invention is to obtain intensities greater than heretofore attainable.

A further object of the invention is to provide an iraser reaction composition that will utilize its own reaction components for further reaction.

A still further object of the invention is to provide an iraser reaction chamber construction that will minimize reaction and electrode sputtering due to the results of electrical discharge.

In accordance with the prime object of the invention, water vapor is added to the carbon dioxide and nitrogen atmosphere of the iraser discharge space and, with favorable pressure ratios, results in a substantial increase in the resulting emission intensity. The mixture of carbon dioxide gas, nitrogen and water vapor results in energy transitions with an intensity of the order of a few watts which can be produced in a confocal interaction space of approximately 1 m. length and 3 cms. diameter. The input power need not be higher than from 100 to 200 w.

One possible reason for the increase in intensity by the addition of water vapor could be that the lowest carbon dioxide iraser transition levels readily transfer their energy to water vapor.

The transitions lie in the wave length range of from 10.6 to 10.7 microns. For communication purposes these great wave lengths have the advantage of a low absorption and a small amount of stray in the atmosphere.

In accordance with a further object of the invention it may be desirable to add carbon monoxide or oxygen to the carbon dioxide already present in order to cause the decomposition products of the carbon dioxide which might be formed in the closed reaction space to react with each other again to the extent possible.

Figure 1:
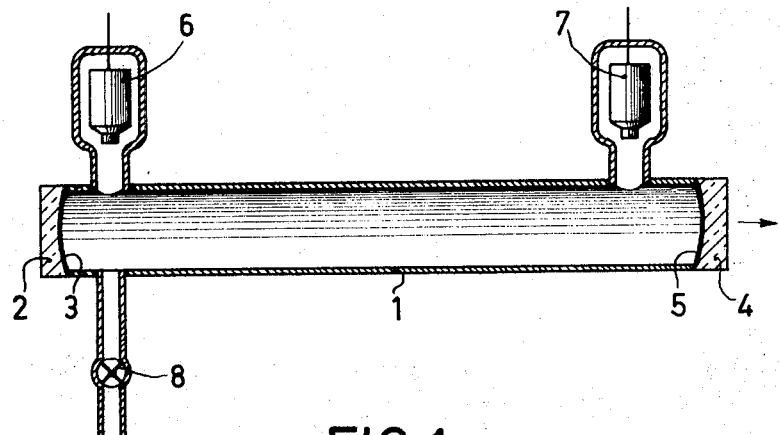

Favorable compositions of a gas filling in the non-flowing device of FIG. 1 in accordance with the invention are: 0.8–1 torr carbon dioxide, 2 to 3 torr nitrogen, 0.3–0.7 torr water vapor. Instead of pure carbon dioxide with nitrogen and water vapor it is also possible to use 0.7 to 0.8 torr carbon dioxide with 0.2 torr carbon monoxide or oxygen, amounting to from about 0.1 to 0.25 of the quantity of carbon dioxide.

In accordance with a still further object of the invention, it is preferable to use hollow platinum cathodes as electrodes in order to limit electrode reaction and sputtering.

Figure 2:
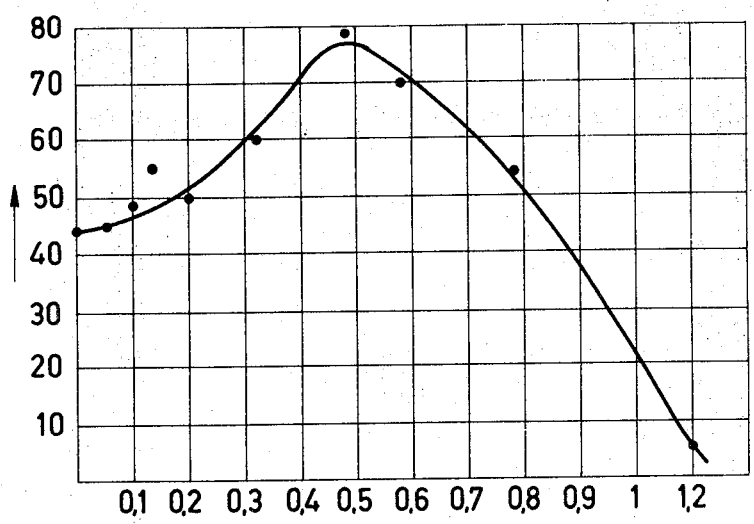

The invention will now be described more fully with reference to the drawing, wherein:

FIG. 1 shows diagrammatically a discharge tube of a device in acordance with the invention, and FIG. 2 illustrates examples of results obtained therewith.

In FIG. 1 the discharge space is constituted by a glass tube 1 of 1 m. length and 3 cms. inner diameter. To one end there is secured a concave quartz mirror 2 coated with a gold layer 3. At the other end there is secured a mirror 4 which consists of germanium coated with a dichroic layer 5. The radius of curvature of the mirrors 2 and 4 is '038 mm. The electrodes 6 and 7 are arranged in side spouts and consist of platinum sleeves with small apertures extending into the discharge space. A filling tube is provided with a shut-off valve 8 and is connected to a filling installation (not shown).

The tube is filled with 1 torr carbon dioxide, 2 torr nitrogen, and a variable quantity of water vapor. The electrical discharge is of continuous direct current having a burning voltage of 5 kv. at a current strength of approximately 28 ma.

FIG. 2 illustrates a relative representation, in arbitrary units, of stimulated emission in the wave length range of from 10.6 to 10.7 microns in accordance with the pressure of the water vapor in torr. As compared with the absence of water vapor, the maximum of the curve ascends approximately by a factor 2.

What is claimed is:
1. A device for producing stimulated infrared emission, comprising, a discharge space enclosure having an optical path length defined by first and second optical reflecting means secured at spaced points to said enclosure, means for passing an electric current through said discharge space, said discharge space consisting of a non-flowing mixture of gaseous carbon dioxide in the range of 0.8–1 torr, nitrogen in the range of 2–3 torr and water vapor in the range of 0.3 to 0.7 torr said water vapor quantity being sufficient to raise the output of the device significantly relative to the output of the device with amounts of water vapor outside of said water vapor range.

2. A device for producing stimulated infrared emission, comprising, a discharge space enclosure having an optical path length enclosed by first and second substantially confocal mirrors secured at opposing ends of the discharge space enclosure, first, and second electrodes penetrating said enclosure for producing a continuous electrical current discharge through said discharge space, said discharge space consisting of a non flowing mixture of gaseous carbon dioxide in the range of 0.8–1 torr, nitrogen in the range of 2–3 torr, and water vapor, said water vapor present within the range of 0.3 to 0.7 torr.

3. The combination of claim 2 wherein said discharge space further includes a quantity of carbon monoxide.

4. The combination of claim 2 wherein the said carbon dioxide lies in the range of 0.7 to 0.8 torr and said discharge space further includes 0.2 torr of carbon monoxide.

5. The combination of claim 2 wherein said electrodes consist of hollow platinum cylinders.

6. A device for producing stimulated infrared emission, comprising a discharge space enclosure having an optical path length defined by first and second enclosure, means for passing an electric current through said discharge space, said discharge space consisting of a non flowing mixture of gaseous carbon dioxide in the range of 0.7 to 0.8 torr, nitrogen in the range of 2 to 3 torr, water vapor in the range of 0.3 to 0.7 torr and oxygen from about 0.1 to 0.25 of the quantity of carbon dioxide.

References Cited

UNITED STATES PATENTS 3,387,226   6/1968   Haisma et al. _____ 331—94.5

OTHER REFERENCES

"Laser Oscillation on Visible and Ultraviolet Transitions on Singly and Multiply Ionized Oxygen, Carbon, and Nitrogen," R. McFarlane, App. Phys. Lett., 5(5), Sept. 1, 1964, pp. 91–3.

"Selective Excitation Through Vibrational Energy Transfer and Optical Maser Action in $N_2$—$CO_2$," C. Patel, Phys. Rev. Lett., 13(21), Nov. 23, 1964, pp. 617–619.

"Improved Platinum Electrodes," L. Miller, IBM Tech. Discl. Bul. 7(7), December 1964, p. 647.

"CW High Power in $N_2$—$CO_2$ Laser," C. Patel, App. Phys. Lett., 7(1), July 1, 1965, pp. 15–17.

"Effect of Foreign Gases on the $CO_2$ Laser: R-Branch Transitions," J. Howe, App. Phys. Lett., 7(1), July 1, 1965, pp. 21–22.

"On the Possibilities of Realizing an Optical Maser Utilizing the Vibrational Energy of Gases Excited by Active $N_2$," (in French), Legay et al., C. R. Acad. Sci., vol. 259, pp. 99–102, July 6, 1964.

RONALD L. WIBERT, Primary Examiner

R. J. WEBSTER, Assistant Examiner

U.S. Cl. X.R.

313—218